US012192552B2

(12) United States Patent
Ramesh et al.

(10) Patent No.: US 12,192,552 B2
(45) Date of Patent: Jan. 7, 2025

(54) CONTROLLING MEDIA-CONTENT PRESENTATION BASED ON MOVEMENT OF MEDIA-PLAYER DEVICE FROM HOME LOCATION TO VISITED LOCATION

(71) Applicant: Roku, Inc., San Jose, CA (US)

(72) Inventors: Sunil Ramesh, Cupertino, CA (US); Michael Cutter, Golden, CO (US); Ronica Jethwa, Mountain View, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 2 days.

(21) Appl. No.: 18/060,451

(22) Filed: Nov. 30, 2022

(65) Prior Publication Data

US 2024/0179362 A1 May 30, 2024

(51) Int. Cl.
*H04N 21/258* (2011.01)
*H04N 21/488* (2011.01)

(52) U.S. Cl.
CPC ... *H04N 21/25841* (2013.01); *H04N 21/4882* (2013.01)

(58) Field of Classification Search
CPC .............. H04N 21/25841; H04N 21/4882
See application file for complete search history.

(56) References Cited

U.S. PATENT DOCUMENTS

| 10,887,627 | B2* | 1/2021 | Miller | H04N 21/4131 |
| 2010/0250707 | A1* | 9/2010 | Dalley | G06Q 30/0202 |
| | | | | 709/219 |
| 2015/0052554 | A1* | 2/2015 | Iyengar | H04N 21/23106 |
| | | | | 725/35 |
| 2016/0142765 | A1* | 5/2016 | Ogle | H04N 21/42202 |
| | | | | 725/38 |
| 2016/0249213 | A1* | 8/2016 | Wong | H04L 65/612 |

* cited by examiner

Primary Examiner — Sumaiya A Chowdhury
(74) Attorney, Agent, or Firm — McDonnell Boehnen Hulbert & Berghoff LLP

(57) ABSTRACT

A method and system for controlling media-content presentation. An example method includes a computing system detecting that a media-player device has moved from a home location of the media-player device to a visited location and that the media-player device is connected with a media-presentation device at the visited location. Further, the example method includes, responsive to the detecting, the computing system causing the media-player device to output, for presentation by the media-presentation device at the visited location, media content selected by the computing system based on the media-player device having moved from the home location to the visited location. For instance, the computing system could cause the media-player device to output, for presentation by the media-presentation device, a message welcoming a user to the visited location and/or information about the visited location such as information about tourist attractions at the visited location for instance.

20 Claims, 8 Drawing Sheets

CONTROLLING MEDIA-CONTENT PRESENTATION BASED ON MOVEMENT OF MEDIA-PLAYER DEVICE FROM HOME LOCATION TO VISITED LOCATION

SUMMARY

A typical media-player device ("media player") may operate to output media content for presentation by a media-presentation device which with the media player is connected. Examples of media players include, without limitation, over-the-top (OTT) streaming media players, cable or satellite set top boxes, gaming systems, mobile phones, audio players, and personal computers. And examples of media-presentation devices include, without limitation, televisions, monitors, projectors, and sound-speakers.

A user may purchase, lease, or otherwise obtain a media player for use in connection with a media-presentation device at a location where the user is often located. For instance, a user may obtain a media player for use in connection with a media-presentation device at the user's home or office. At that location, the user may connect the media player with a media-presentation device, and the user may then use the media player to play media content for presentation by that media-presentation device. This location may be considered a "home" location or "first" location of the media player, namely, a location where the media player is generally located and used, even if the location is not literally a residence or primary residence.

At times, the user may also move the media player to other locations and may use the media player to play media content at the other locations. For instance, if the user goes on vacation or other travel, whether temporarily or permanently, the user may bring the media player with the user to another location, and the user may use the media player with a media-presentation device at that other location, to play media content for presentation by the media-presentation device. This other location may be considered a "visited" location or "second" location by comparison with the media player's home or first location, even if the media player is at the visited location permanently or semi-permanently, and even if the media player is used more often at the visited location than at the home location. Examples of a visited location include, without limitation, a hotel, a rental property, a vacation home, a satellite office, and a recreational vehicle.

The media-presentation device at the visited location may or may not be the same as the media-presentation device at the home location. In one example scenario, for instance, the user may disconnect the media player from the media-presentation device at the home location and then connect the media player with a different media-presentation device at the visited location. In another example scenario, the user may bring not only the media player but also the media-presentation device from the home location to the visited location, and the user may then use the media player connected with the same media-presentation device at the visited location, with or without disconnecting and reconnecting the media player.

When a user travels from one location to another and brings the user's media player with to the visited location, the user may use the media player in connection with a media-presentation device at the visited location to play media content that the user enjoys. For instance, the user may power on the media player and the media-presentation device and then use a remote control or other user-interface mechanism to cause the media player to output for presentation on the media-presentation device a particular channel of content or stored content, such as a particular program, movie, or other content that the user enjoys.

The present disclosure stems from a realization that, when a user brings a media player to a visited location, it may also be useful to have the media player play content selected automatically based on the fact that the media player moved from the home location to the visited location. In particular, it may be useful to have a computing system respond to the fact that the media player moved from the home location to the visited location by causing the media player to play content that the computing system selects based on a consideration of the fact that the media player has been moved from the home location to the visited location.

For example, when the user first powers on the media player and the media-presentation device at the visited location, it may be useful for a computing system to recognize that the media player has moved from its home location to the visited location and respond to that recognition by causing the media player to output for presentation by the media-presentation device a welcome message that welcomes the user to the visited location. Further, it may be useful for the computing system to respond to the media player having moved from the home location to the visited location by causing the media player to output a prompt that prompts the user to direct the media player to provide information about the visited location, such as information about activities and services available at the visited location. As still another example, it may be useful for the computing system to select media content to have the media player output at the visited location based on historical data showing that in other instances where media players have moved from the home location to the visited location, users have selected such media content for playout.

Accordingly, disclosed is a method and system for controlling media-content presentation based on movement of a media player from a home location to a visited location. In an example method, a computing system will detect that a media player has moved from a home location of the media player to a visited location and that the media player is connected with a media-presentation device at the visited location, and, responsive to the detecting, the computing system will then cause the media player to output, for presentation by the media-presentation device at the visited location, media content selected by the computing system based on the media player having moved from the home location to the visited location.

The computing system in this method may include the media player and/or a network server with which the media player interacts, among possibly other devices. The step of the computing system detecting that the media player has moved from the home location to the visited location may therefore be carried out by the media player and/or by the network server, among other possibilities. Further, the act of responding to the detecting by causing the media player to output, for presentation by the media-presentation device, the media content selected by the computing system based on the media player having moved from the home location to the visited location, may likewise be carried out by the media player and/or by the network server, among other possibilities.

These as well as other aspects, advantages, and alternatives will become apparent to those of ordinary skill in the art by reading the following detailed description, with reference where appropriate to the accompanying drawings. Further, it should be understood that the descriptions pro-

DETAILED DESCRIPTION

The present description will discuss an example implementation where the media player is an OTT media player (such as a Roku® Streaming Stick® or other device), configured to be connected with a television or other media-presentation device and to play OTT content streamed on demand from an OTT server, for presentation by the media-presentation device. It should be understood, however, that principles discussed herein could extend to apply as well with respect to other types of media players and media-presentation devices, such as but not limited to those noted above.

More generally, it should be understood that the arrangements and processes described herein could take various other forms. For instance, elements and operations could be re-ordered, distributed, replicated, combined, omitted, added, replaced, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units or other processors executing program instructions stored in memory or other data storage, among other possibilities.

Figure 1:
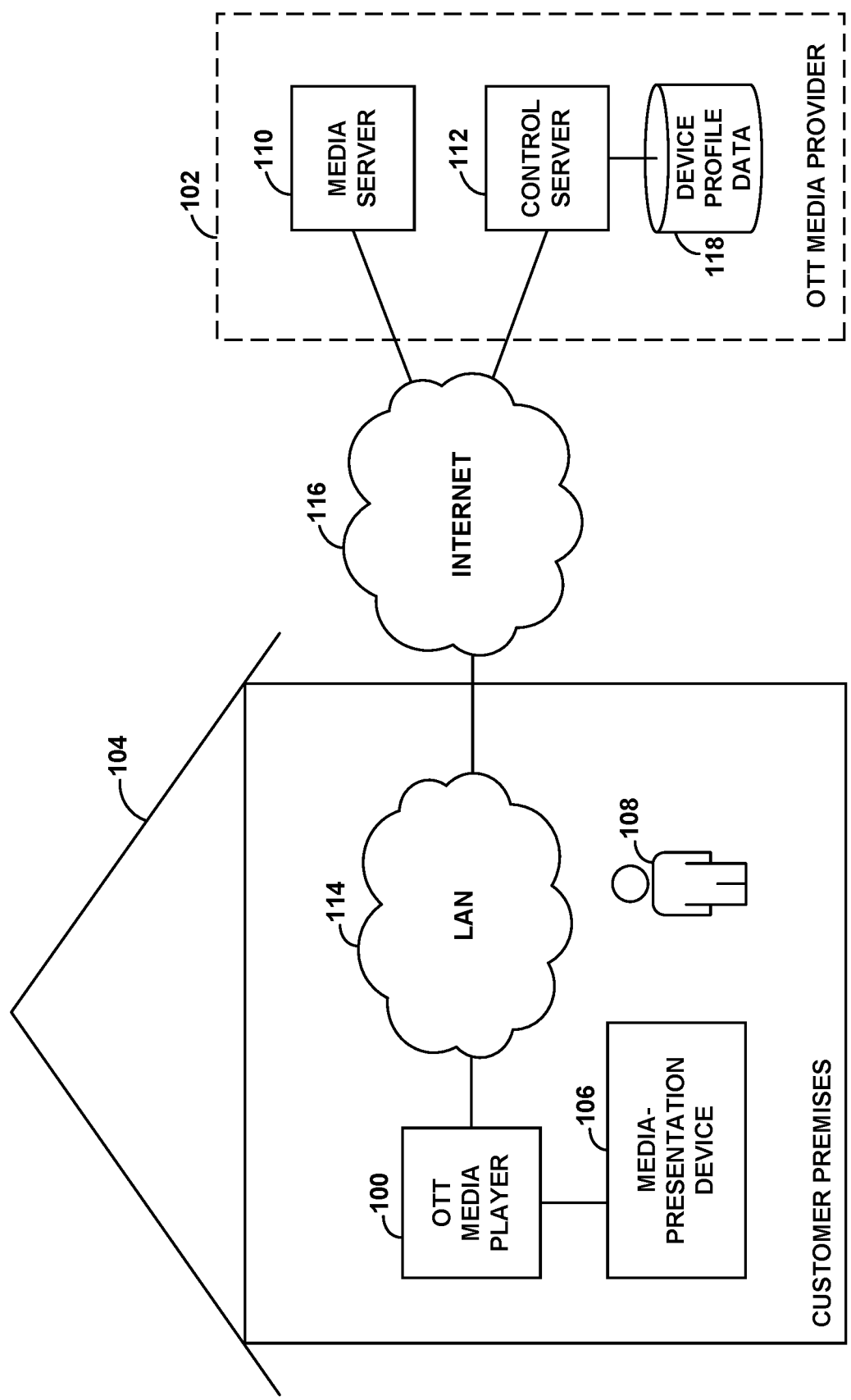
FIG. 1 is a simplified block diagram of an example OTT system

Referring to the drawings, FIG. 1 is a simplified block diagram of an example OTT system. The example OTT system includes an OTT media player 100, which is configured to receive and play streaming media content, and a network-based OTT media provider 102, which is configured to stream and/or otherwise provide media content to the media player 100 for playout.

As shown, the media player 100 may be located at a customer premises 104, such as a house, apartment, or business establishment and may be connected there with a television or other media-presentation device 106 that is configured to receive media content being played by the media player 100 and to present the media content to one or more users, such as an example user 108. For instance, the media player 100 could be connected with the media-presentation device 106 by a High Definition Multimedia Interface (HDMI) connection and/or by one or more other wired or wireless connections.

As further shown, the example OTT media provider 102 includes a media server 110 and a control server 112 (e.g., a server platform including one or more such servers). The media server 110 may support streaming or otherwise providing of media content on demand to the media player 100, for playout by the media player 100. And the control server 112 may facilitate streaming of the media content from the media server 110 to the media player and may also engage in other control interaction with the media player 100, such as to provide the media player 100 with GUIs for the media player 100 to render for presentation, and to receive and respond to user input received by the media player 100 through such GUIs, requesting particular on-demand content for instance.

In an example implementation, the media player 100 could be in network communication with both the media server 110 and the control server 112. For instance, the media player 100 may sit as a node on a local area network (LAN) 114 at the customer premises 104, having an assigned local Internet Protocol (IP) address for communication on that LAN 114, and the LAN 114 may be interconnected with the public internet 116, having an assigned public IP address for communication on the internet. Further, the media server 110 and control server 112 may also have assigned public IP addresses on the internet. The media player 100 may therefore engage in IP-based communication with the media server 110 and the control server 112 through the LAN 114 and through the internet 116.

In addition, the media provider 102 may include or otherwise have access to data that helps enable the media provider 102 to serve the media player 100. For instance, as shown, the media provider 102 may have access to device profile data 118. This device profile data 118 may include information about configuration and capabilities of each of various media players served by the media provider 102, including media player 100, such as but not limited to a list of streaming-media channels (e.g., OTT channels) that are to be made available to the media player, a history of media played by the media player, and information about various settings and configuration parameters of the media player, among other possibilities.

When the media player 100 and media-presentation device 106 are connected with each other and powered on, the media-presentation device may present media content that the media player 100 plays and thus outputs. This media content may include a GUI defining a menu structure through which a user of the media player 100 may navigate, through use of a remote control or other input device, in order to select and request playout of desired on-demand media content (e.g., programs or movies) and/or to make configuration changes to the media player 100. Further, the media content may then include selected on-demand media content, such as streaming-media content selected by a user and served by the media server 110, for instance.

Figure 2:
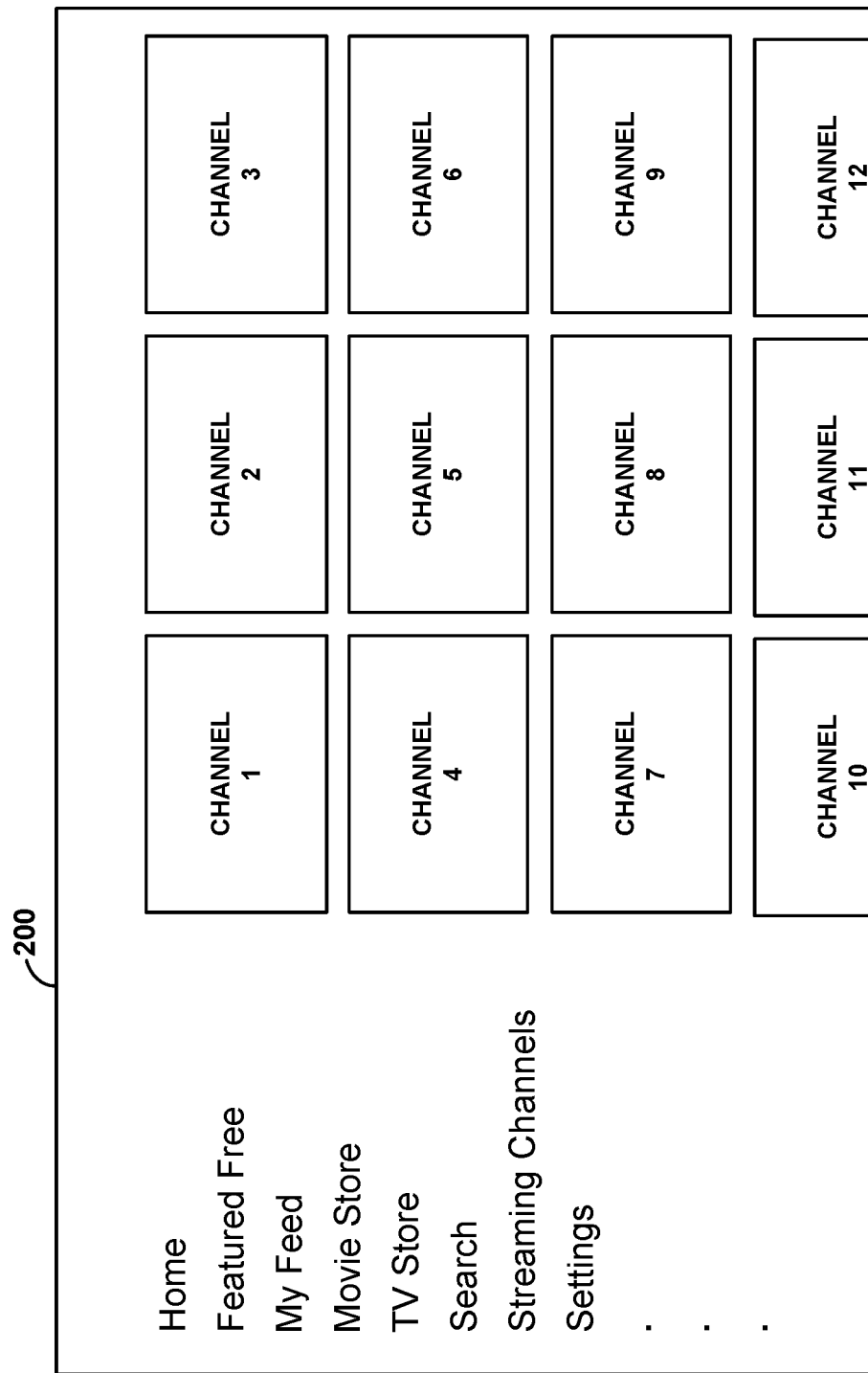
FIG. 2 is a simplified illustration of an example graphical user interface (GUI) that a media player may output for presentation.

FIG. 2 illustrates an example GUI 200 that the media player 100 may output for presentation by the media-presentation device 106 as a default or "home" menu interface (e.g., when the media player 100 first starts up and/or when the media player 100 returns to a default mode after playing on-demand content or upon user direction). (The term "home" used in this context is different than the term "home" describing a location of the media player; as used here, the term relates to a default menu interface.) As shown in FIG. 2, the example GUI 200 includes at its right side various graphical objects representing respective streaming media channels available for user selection. By navigating through this GUI and perhaps through one or more sub-GUIs, a user may thereby select and request playout of desired on-demand content, which may trigger signaling between the media player 100 and the media provider 102 to initiate streaming of the requested content to the media player 100 for playout. Further, the example GUI 200 includes at its left side a list other user-selectable options, including a streaming-channels option through which the user may configure what channels would be presented at the right side of the GUI 200, among other possibilities.

The media player 100 may interwork with the control server 112 to obtain this and/or other GUIs for the media player 100 to output for presentation by the media-presentation device 106. For instance, the media player 100 may engage in control signaling with the control server 112 to request a GUI, the control server 112 may responsively deliver the GUI to the media player 100 in the form of one or more markup documents (e.g., Hypertext Markup Language (HTML) documents) defining the GUI, and the media player 100 may then render the GUI as media for presentation by the media-presentation device 106. Further, the media player 100 may engage in this interaction with the control server 112 in the background and may store the GUI markup documents for later use when appropriate.

The control server 112 may structure such a GUI (e.g., one or more markup documents defining the GUI) in accordance with the device profile data 118. The media player 100 might initially have a factory-default configuration, and the device profile data 118 may store that default configuration, so that a GUI provided by the control server 112 would have a default menu structure, including a default set of channels for instance. When a user interacts with the media player 100 to change the media player's configuration, such as adding or removing channels for example, the media player 100 may signal those changes to the control server 112, and the control server 112 may update the device profile data 118 accordingly, so that a GUI then provided by the control server would reflect the changed configuration.

When a user navigates through a GUI such as that shown in FIG. 2 and selects a streaming media channel or other media content to be played by the media player 100, the media player 100 may then engage in the signaling with the control server 112 and/or the media server 110 to initiate streaming of that media content to the media player 100 for playout and presentation by the media-presentation device 106. Streaming of media content on demand from the media server 110 to the media player 100 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. The details of these streaming protocols and their associated control signaling are known and therefore not described here.

As the media player 100 plays on-demand media content, the media player 100 and/or media provider 102 may keep a record of the media content played. For instance, as the media player 100 plays on-demand media content streamed by media provider 102, the control server 112 may update the device profile data 118 to establish a record of the content being played. Alternatively, if the played media content is of a particular content type (e.g., a particular genre of content), the control server 112 may update the device profile data 118 to establish a record that the media player 100 played content of that type. Further, the control server 112 may record other data regarding this playout of content, such as an indication of the date and time of playout, among other possibilities.

As discussed above, the present disclosure provides for a computing system detecting when media player 100 has moved from a home location of the media player 100 to a visited location and is connected with a media-presentation device at the visited location, and the computing system responsively causing the media player to output for presentation by the media-presentation device media content that the computing system selects based on the media player having moved from the home location to the visited location. In line with the discussion above, the computing system that carries out this process could include the media player 100 itself and/or one or more network servers, such the control server 112 for instance, among other possibilities.

Figure 3:
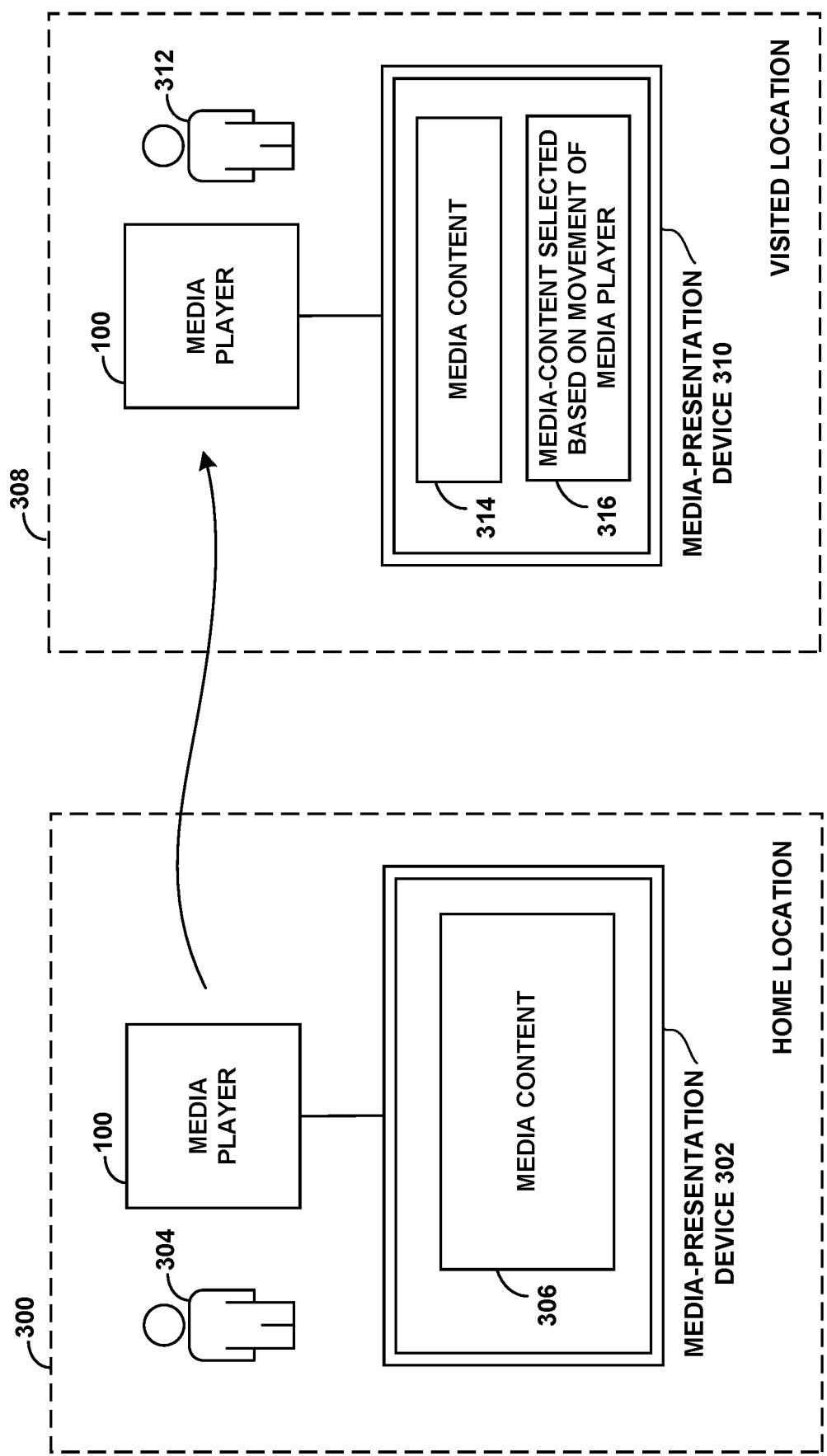
FIG. 3 is simplified illustration of a media player moving from a home location to a visited location and outputting for presentation at the visited location media content selected by a computing system based on the movement of the media player from the home location to the visited location.

FIG. 3 illustrates how this process could work in practice.

As shown in FIG. 3, the media player 100 is initially located at a home location 300 of the media player 100, where the media player 100 is connected with a media-presentation device 302 and is controlled by a user 304. At the home location 300, the media player 100 may thus output media content 306 for presentation by the media-presentation device 302. For instance, the media player 100 may output a GUI, and the media player may output selected streaming media content. The media player 100 is then moved from the home location 300 to a visited location 308, where the media player 100 is connected with a media-presentation device 310 (which may or may not be media-presentation device 302) and controlled by a user 312 (which may or may not be user 304). At the visited location 308, the media player 100 may thus output media content 314 for presentation by the media-presentation device 310. For instance, the media player 100 may likewise output a GUI, and the media player may likewise output selected streaming media content.

As further shown, when the media player 100 has moved from the home location 300 to the visited location 308 and is connected with media-presentation device 310 at the visited location, the media player 100 may output, for presentation by the media presentation by the media-presentation device 310, media content 316 selected by the computing system based on the media player 100 having moved from the home location 300 to the visited location 308. For instance, the media player 100 could output a GUI customized to include information selected based on the media player 100 having moved from the home location 300 to the visited location 308 and/or the media player 100 could output streaming media content selected based on the media player 100 having moved from the home location 300 to the visited location 308.

As part of this process, the computing system may determine in various ways when the media player 100 is and/or becomes connected with a media-presentation device. The connection at issue here could be a local connection, where the media player 100 is locally connected at a common location with the media-presentation device (e.g., where both are at the same customer premises location), as compared with a remote connection such as a connection over the public internet or the like.

In an example implementation, for instance, the media player 100 may detect when it becomes connected with a media-presentation device based on control signaling exchanged between the media player 100 and the media-presentation device over the connection. For instance, if the media player 100 gets connected with the media-presentation device by an HDMI connection, the media player 100 may receive control signaling such as HDMI-CEC (Consumer Electronics Control) signaling that identifies the media-presentation device, perhaps indicating that it is a media-presentation device. Based on this or other such control signaling, the media player 100 may thereby detect when it gets connected with a media-presentation device. The media player 100 may then store a record of this determined connection status and may also report the connection status to the control server 112, which may update a profile record for the media player 100 in device profile data 118 accordingly.

Thus, the computing system may determine when the media player 100 is connected with the media-presentation device 302 at the home location 300, and the computing system may determine when the media player 100 is connected with the media-presentation device 310 at the visited location 308.

In line with the discussion above, the home location 300 and visited location 308 of the media player 100 may be respective locations where the media player could be connected with a media-presentation device and where the media player 100 could operate to output media content for presentation by the media-presentation device. As noted above, examples of such locations could include a house, an office, a hotel, a rental property, a vacation home, and a recreational vehicle. To enable the computing system to detect that the media player has moved from the home location to the visited location, these locations could characterized in various ways, such as but not limited to street address, zip code, city, state, country, and/or geographic coordinates.

When the media player 100 operates at a given location, the computing system may determine and record that location as a location of the media player 100. The computing system could do so in various ways.

As one example, the computing system could use an IP address associated with the media player 100 (e.g., a public IP address assigned to customer premises where the media player 100 operates) as a basis to determine the media player's location. For instance, when the control server 112 engages in IP-based communications with the media player 100, the control server 112 may read the IP address from those communications and may then apply IP geolocation to map the IP address to a corresponding geolocation and/or other location data representing where the media player 100 is located. The control server 112 may then record this determined location as a location of the media player 100. Further, the control server 112 may report this determined location to the media player 100, and the media player 100 may record the determined location as a location of the media player 100.

As another example, the computing system could use satellite positioning, cellular-based positioning, WiFi-based positioning, and/or one or more other techniques to determine the location of the media player 100. For instance, if the media player 100 includes a Global Positioning System (GPS) module, the media player 100 may use that GPS module to determine its location and may record that location and/or report that location to the control server 112 for recording. Further, if the media player 100 includes a cellular communication module, the media player may engage in control communication with a cellular communication network to determine its location and may record that location and/or report that location to the control server 112 for recording. Still further, if the media player 100 includes a WiFi receiver, the media player may detect one or more WiFi service set identifiers (SSID) in its surroundings and may report the detected SSID to the control server 112, and the control server 112 may map refer to SSID-geolocation mapping data to determine a corresponding location and may record that location and/or report the location to the media player 100 for recording.

As still another example, the computing system could determine the location of the media player 100 based on the location of the media-presentation device with which the media player is connected. For instance, the media player 100 may determine an identity of the media-presentation device with which the media player 100 is connected, based on HDMI signaling data for instance, and the media player 100 may query a server that has a record of the location of the identified media-presentation device, to determine the location of the media-presentation device. The media player 100 may then record that determined location as a location of the media player 100 based on the media player 100 being connected with the media-presentation device and/or may report the location to the control server 112 for recording. Alternatively or additionally, if the media-presentation device or another nearby device has a record of its location, the media player 100 may engage in communication with that other nearby device to determine that location and may likewise record that location as a location of the media player 100 and/or report the location to the control server 112 for recording.

As yet another example, the computing system could determine the location of the media player 100 based on manual user input. For instance, a user of the media player 100 may enter into a configuration interface of the media player 100 a location of the media player 100, and the media player 100 may record that entered location as a location of the media player and/or may report the location to the control server 112 for recording. Other location determination mechanisms could be used as well.

When the computing system determines the location of the media player 100, the computing system may record that determined location for later reference. For instance, the media player 100 may store a record of the determined location in its own data storage. Further, the control server 112 may store a record of the determined location in a profile record for the media player 100 in device profile data 118. Further, the computing system may record together with the determined location a timestamp indicating when the media player 100 was determined to be at the location.

The computing system could also update its determination of location of the media player 100 from time to time. As an example, the computing system could determine a current location of the media player 100 in response to the media player becoming connected with a media-presentation device. For instance, when the media player 100 gets connected with a media-presentation device and records and/or reports that connection status as discussed above, the media player 100 and/or control server 112 may respond to the media player getting connected with the media-presentation device by then determining a current location of the media player and updating the device profile data 118 accordingly. As another example, the computing system could update its determination of location of the media player 100 periodically and/or in response to one or more other triggers.

The computing system could have a record of location 300 as being the "home" location of the media player 100, so that the computing system could then determine when the media player 100 has moved from that home location 300 to visited location 308, in order to trigger having the media player 100 output media content selected based on that move. For instance, the computing system could determine that location 300 is the home location of the media player 100 and could record an associated indication, effectively registering location 300 as the home location of the media player 100.

The computing system could determine in various ways that location 300 is the home location of the media player 100.

As one example, the computing system could determine that the location 300 is the home location of the media player 100 based on the computing system determining that the media player 100 has operated at that location for at least a predefined threshold period of time that is deemed sufficient to correlate with "home" status. Examples of this threshold period of time could include a defined period of minutes, hours, days, weeks, months, years, or other durations. The computing system could determine that the media player 100 has operated at location 300 for at least this predefined period of time by evaluating timestamps of when the computing system has determined that the media player 100 is located at location 300.

As another example, the computing system could determine that location 300 is the home location of the media player based on manual user input. For instance, a user of the media player 100 may enter into a configuration interface of the media player 100 an indication of the home location of the media player 100. Other processes could be possible as well.

The computing system may then determine when the media player 100 has moved from the home location 300 to the visited location 308, as a trigger for causing the media player to output media content selected based on that move. For instance, when the media player 100 gets connected with the media-presentation device 310 at the visited location 308, the computing system may respond to detecting that connected status by newly determining a current location of the media player 100. Further, the computing system may then compare that newly determined location of the media player 100 with the registered home location 300 of the media player 100, to determine whether those locations differ enough from each other to suggest that the media player 100 has moved from its home location 300 to a visited location, and thus that the newly determined location is the visited location 308.

For instance, using mapping data, the computing system could determine a distance between the registered home location 300 of the media player 100 and the newly determined location of the media player 100 and could determine whether that determined distance is at least as far as a predefined threshold distance deemed sufficient to indicate that the media player 100 has moved from its home location to a visited location. The predefined distance could be a number of miles, among other possibilities. Alternatively, using mapping data, the computing system could determine whether the home location and newly determined location of the media player are in different cities, states, countries, continents, or other regions than each other, also possibly that that those regions are at least a predefined threshold distance from each other, to indicate that the media player 100 has moved from the home location to a visited location. Other processes could be applied as well.

Once the computing system has determined or otherwise detected that the media player 100 has moved from its home location 300 to the visited location 308 and is connected with a media-presentation device at the visited location 308, the computing system may then cause the media player 100 to output, for presentation by the media-presentation device, media content that the computing system selects based on the media player 100 having moved from the home location 300 to the visited location 308.

The process of the computing system "selecting" this media content may involve the computing system selecting the media content from a set of existing media content and/or the computing system selectively establishing the media content, among other possibilities.

Further, the act of the computing system causing the media player 100 to output this selected media content could take various forms. For instance, if the control server 112 determines that the media player 100 should output such media content, the control server 112 may engage in control signaling with the media player 100 and/or with the media server 110 to tailor media content that the media player 100 outputs, perhaps media content that is or will be streamed to the media player 100 for playout, to include the selected media content. Alternatively, if the media player 100 determines that the media player 100 has moved from the home location 300 to the visited location 308, the media player 100 may itself tailor media content that the media player 100 outputs, to include the selected media content.

As one example, the computing system could respond to detecting that the media player 100 has moved from the home location 300 to the visited location 308 and is connected with a media-presentation device at the visited location 308 by causing the media player to output a welcome message that welcomes the user 312 to the visited location 308. One of possibly many ways for the computing system to do this is to tailor a GUI that the media player 100 would output, such as by adding to the GUI an overlay, banner, or other graphic element that presents the welcome message. This welcome message could include a still image, video, and/or audio message that includes language welcoming the user and identifying the visited location as the subject of the welcoming. For instance, if the visited location 308 is Moab, Utah, the computing system could structure the welcome message to state "Welcome to Moab!" among other possibilities. Further, the computing system could structure the welcome message to include other related language such as "Enjoy your stay!"

Further, the computing system could refer to data indicating past movement of the media player, such as data stored in the device profile store 118 for instance, and thereby determine that the media player 100 has previously moved from the home location to the visited location or otherwise has previously been in the visited location. And in response to such a determination, the computing system could structure the welcome message as a welcome-back message. For instance, the computing system could structure the welcome message to state "Welcome back to Moab!" among other possibilities.

As another example, the computing system could respond to detecting that the media player 100 has moved from the home location 300 to the visited location 308 and is connected with a media-presentation device at the visited location 308 by causing the media player 100 to output a prompt that prompts a user of the media player 100 to direct the media player 100 to provide information about the visited location 308.

For instance, in a welcome message or other such message that the computing system causes the media player 100 to output, the computing system could include language that prompts the user to tune the media player 100 to a travel-related channel or the like, such as a channel that would present information about the visited location 308. For example, the computing system could include an actionable graphic element such as a button that prompts clicking by the user to cause the media player 100 to play such a travel-related channel of content.

As a related example, the computing system could respond to detecting that the media player 100 has moved from the home location 300 to the visited location 308 by causing the media player 100 to output streaming-media content that provides information about the visited location 308 such as information about activities and/or resources at the visited location 308.

For instance, the computing system could gather, collect, synthesize, and/or otherwise establish streaming media content that depicts, describes, and/or otherwise indicates activities and/or resources at the visited location 308. For example, if there are hiking trails and restaurants in the visited location 308, the computing system may compile video showing features of the hiking trails and restaurants, and the computing system may make that compiled video available for streaming to the media player 100 in a travel channel or other streaming media channel accessible through the media player 100. This way, if a user of the media player 100 selects that travel channel, possibly in response to a prompt as described above, the media player 100 could output that streaming-media content, thus providing the user with useful information about the visited location 308.

As yet another example, the computing system could respond to detecting that the media player 100 has moved from the home location 300 to the visited location 308 by causing the media player 100 to output media content that the computing system determines would be of interest to a user who has traveled from the home location 300 to the visited location 308.

Figure 4:
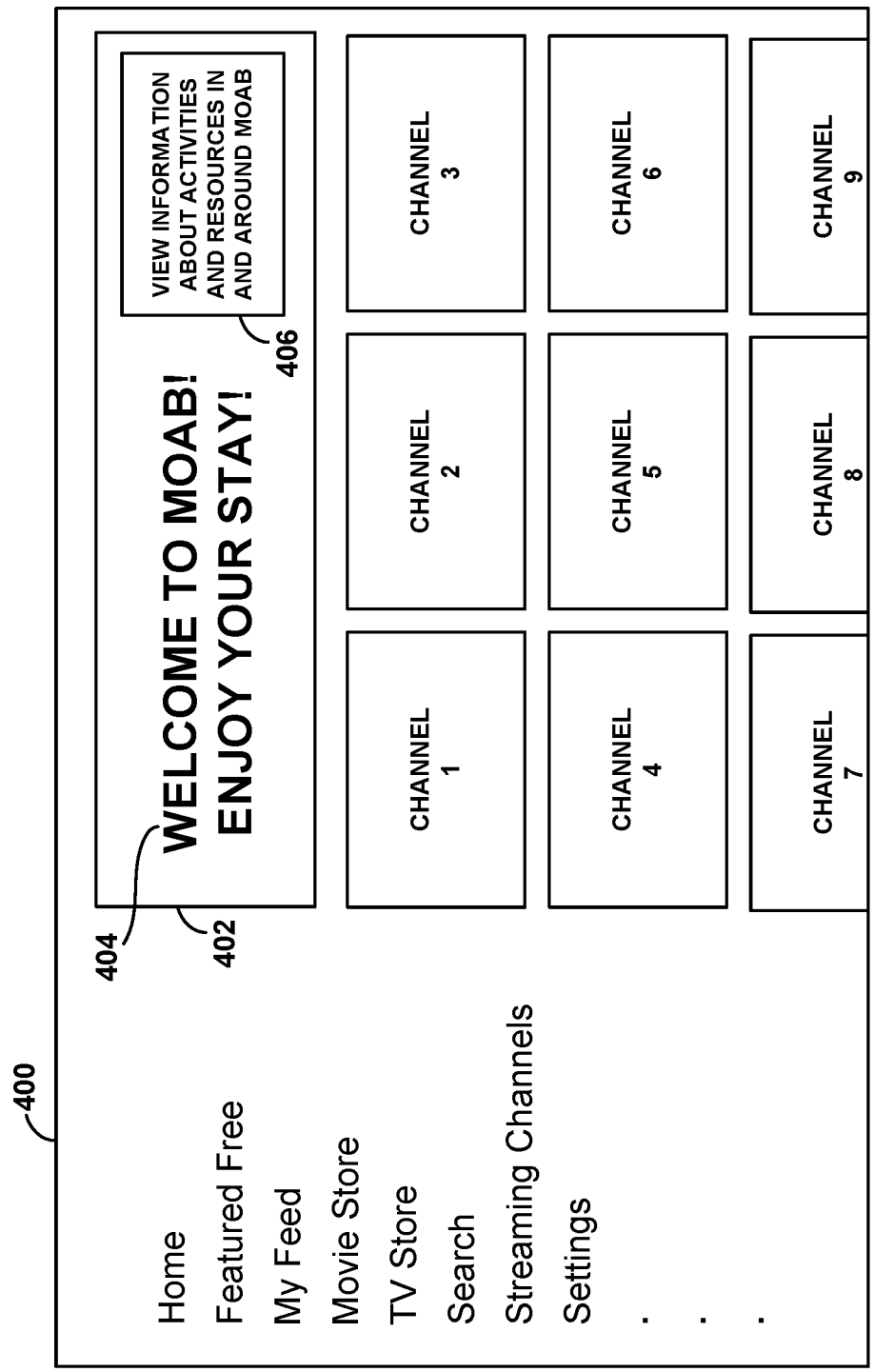
FIG. 4 is a simplified illustration of a media-player GUI including a welcome message established based on detecting that the media player has moved from the home location to the visited location.

For instance, the computing system could refer to its recorded data regarding movement of other media players from location to location and regarding playout of media content by those media players in relation to their movement, and the computing system may thereby detect that, in the past, media players that have been moved from around the same home location 300 to around the same visited location 308, have then played particular content (e.g. particular programs or movies), such as that users of those media players have tended to select that particular content for playout at the visited location 308. Based on this analysis, the computing system may select media content that is similar to or the same as that particular content (e.g., media content of a similar type, genre, class, or the like). Further, the computing system may then cause the media player 100 to present a prompt for a user of the media player 100 to direct the media player to play that selected content. This way, as with the example above, if a user of the media player 100 responds positively to that prompt, the media player 100 may then output that selected content FIG. 4 illustrates one of possibly many examples of how a welcome message could look in practice in line with one or more of these examples. FIG. 4 illustrates a modified version 400 of the GUI shown in FIG. 2. In the modification as shown, the GUI includes a banner graphic 402 that presents a welcome message 404 stating "Welcome to Moab! Enjoy your stay!" and including a button 406 prompting a user to direct the media player 100 to access content regarding Moab. In this example, for instance, the computing system may structure the GUI such that the button links to a streaming-media channel that would present useful information about Moab, such as activities and resources in Moab. Further, the computing system may structure the GUI to allow a user to dispose of the welcome message by remote control input.

In an example implementation, the computing system may thus respond to detecting that the media player 100 has moved from the home location 300 to the visited location 308 and is connected with a media-presentation device at the visited location 308 by causing the media player 100 to output this welcome message 404 and, if the user engages the button 406, then causing the media player to play streaming-media content including useful information about the visited location 308. Other examples are possible as well.

Figure 5:
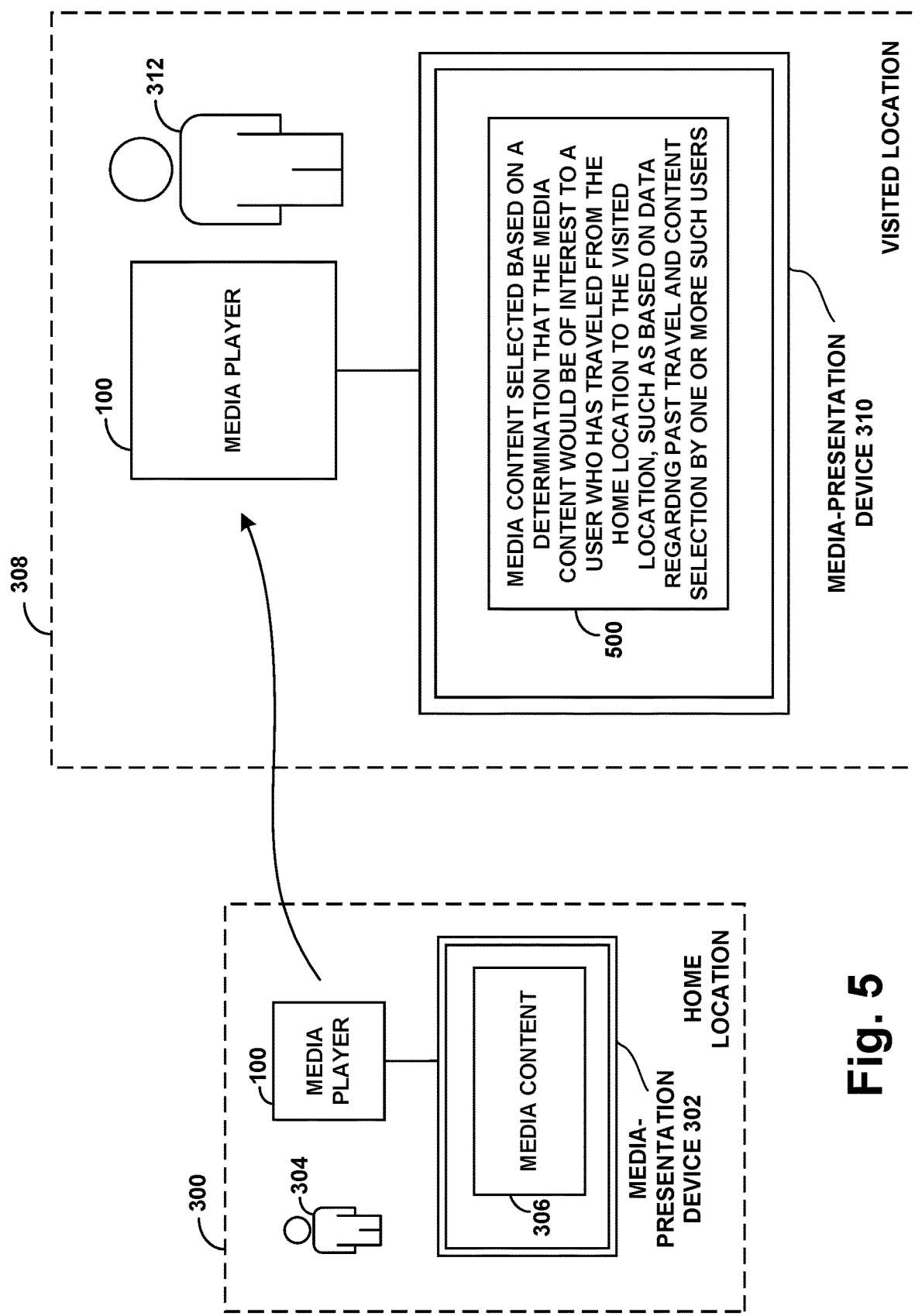
FIG. 5 is a simplified illustration of a media player moving from a home location to a visited location and outputting for presentation at the visited location media content selected by a computing system based on a determination that the media content would be of interest to a user who has moved from the home location to the visited location.

FIG. 5 next illustrates how the computing system may respond to detecting that the media player 100 has moved from the home location 300 to the visited location 308 by causing the media player 100 to output, for presentation by the media-presentation device, media content 500 selected by the computing system based on a determination that the media content would be of interest to a user who has traveled from the home location 300 to the visited location 308, as discussed above.

Figure 6:
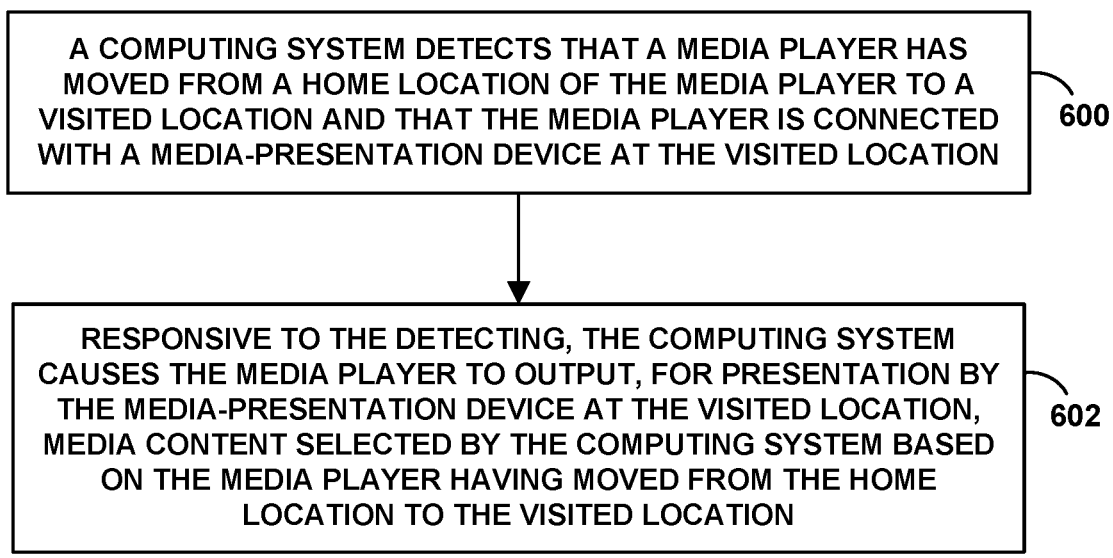
FIG. 6 is a flow chart illustrating a method that could be carried out in accordance with the present disclosure.

FIG. 6 is next a flow chart illustrating an example method that could be carried out in accordance with the present disclosure, to control media-content presentation. As shown in FIG. 6, at block 600, the method includes a computing system detecting that a media player has moved from a home location of the media player to a visited location and that the media player is connected with a media-presentation device at the visited location. Further, at block 602, the method includes, responsive to the detecting, the computing system causing the media player to output, for presentation by the media-presentation device at the visited location, media content selected by the computing system based on the media player having moved from the home location to the visited location.

In line with the discussion above, the media-presentation device in an example implementation could be a television or other device, which could include a display device, in which case the media content that the computing system causes the media player to output for presentation by the media-presentation device could include video content, which may itself include GUI content, streaming-media content, and/or other types of content.

As further discussed above, the act of detecting that the media player has moved from the home location to the visited location and that the media player is connected with a media-presentation device at the visited location could involve (i) determining a current location of the media player when the media player is connected with the media-presentation device, (ii) comparing the determined current location of the media player with the home location, and (iii) determining, based on the comparing, that the media player has moved from the home location to the current location, with the current location defining the visited location.

In addition, as discussed above, the act of detecting that the media player has moved from the home location to the visited location and that the media player is connected with a media-presentation device at the visited location could involve detecting a local connection of the media player with the media-presentation device at the visited location.

Further, as discussed, the computing system could include the media player and a server platform (e.g., one or more servers) in network communication with the media player, in which case the detecting and causing operations of the computing system could be carried out by the media player and/or by the server platform. For instance, the media player could detect that it has moved from its home location to a visited location and that it is connected with a media-presentation device, and the media player could responsively cause itself to output for presentation by the media-presentation device the media content selected based on that move. Alternatively the server platform could detect that the media player has moved from the home location to the visited location and is connected with a media-presentation device, and the server platform could responsively engage in signaling with the media player to cause the media player to output for presentation by the media-presentation device the media content selected based on the move. Other examples are possible as well.

In addition, as discussed above, the act of causing the media player to output, for presentation by the media-presentation device, media content selected by the computing system based on the media player having moved from the home location to the visited location could involve causing the media player to output, for presentation by the media-presentation device, a welcome message welcoming a user to the visited location. Further, in this case, as discussed, the method may also include determining that the media player has previously traveled from the home location to the visited location and, based on the determining that the media player has previously traveled from the home location to the visited location, making the welcome message a welcome-back message.

As further discussed above, the act of causing the media player to output, for presentation by the media-presentation device, media content selected by the computing system based on the media player having moved from the home location to the visited location could involve causing the media player to output, for presentation by the media-presentation device, a message that prompts a user of the media player to direct the media player to output, for presentation by the media-presentation device, information about the visited location. For instance, the computing system may cause the media player to present a GUI that includes an actionable link prompting the user to select playout of such media content.

Still further, as discussed above, the method could include the computing system selecting, based on the media player having moved from the home location to the visited location, the media content to be output by the media player for presentation by the media-presentation device at the visited location. For instance, the computing system could perform this selecting based on a comparison of the visited location with the home location, perhaps determining based on such a comparison what media content users from the home location may find interesting or preferable when visiting the visited location. Further, the selecting could involve selecting content that the describes (e.g., indicates) an activity at the visited location. Yet further, the selecting could be based on data indicating content preference by one or more users who have traveled from the home location to the visited location, such as data indicating that when media players have moved from the home location to the visited location, the media players have tended to play particular media content or particular types of media content, among other possibilities.

Figure 7:
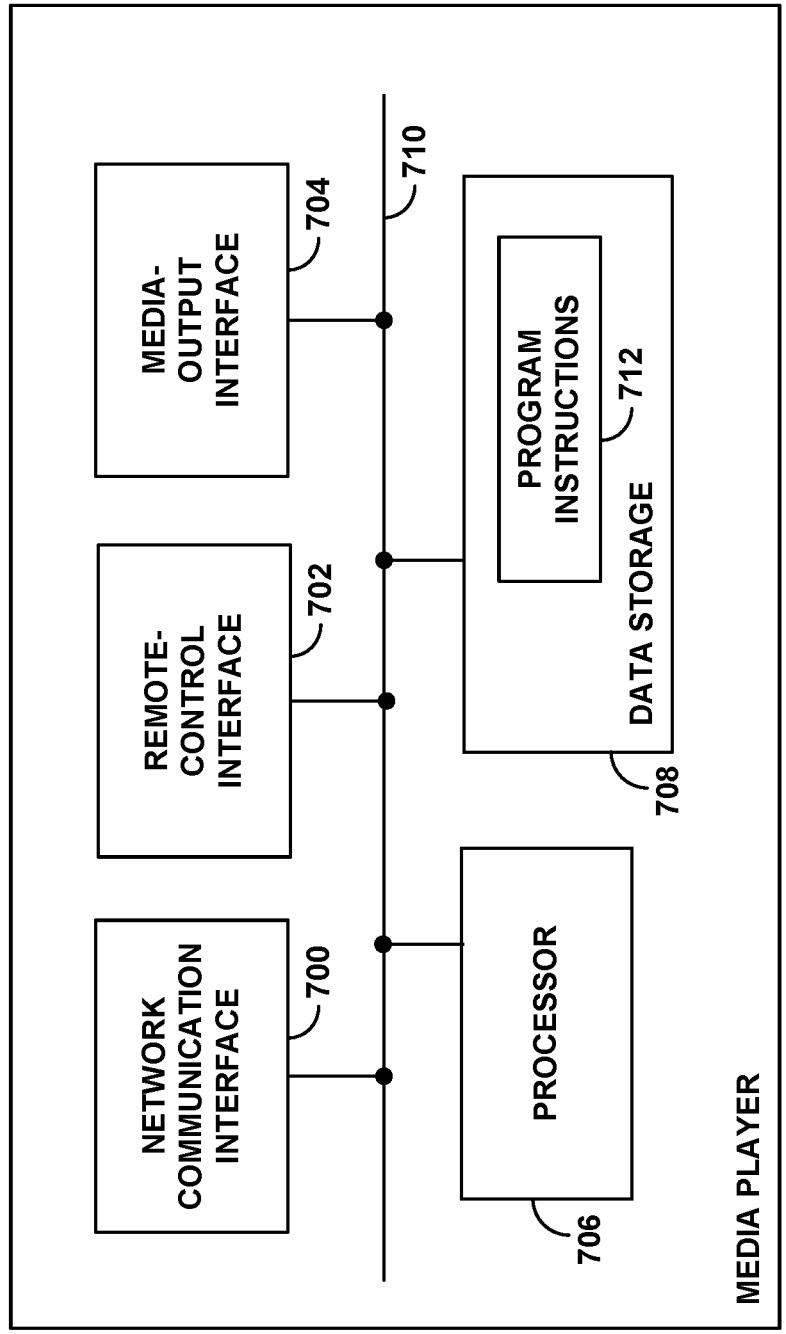
FIG. 7 is a simplified block diagram of an example media player.

FIG. 7 is a simplified block diagram of an example media player such as an OTT media player. As shown in FIG. 7, the example media player includes a network communication interface 700, a remote-control interface 702, a media-output interface 704, a processor 706, and non-transitory data storage 708, any or all of which could be integrated together or, as shown, communicatively linked together by a system bus, network, or other connection mechanism 710.

The network communication interface 700 could comprise a physical communication interface and associated logic, enabling the media player to engage in network communication, such as to engage in control signaling with one or more control servers and to receive streaming media from one or more media servers, among other possibilities. In an example implementation, the network communication interface 700 could include a WiFi interface facilitating WLAN communication, through which the media player could engage in internet communication with a server platform as discussed above.

The remote-control interface 702 could comprise a physical short-range wireless communication interface and associated logic, enabling the media player to engage in communication with a handheld remote control, such as to receive user commands to navigate through GUIs and to control playout of streaming media, among other possibilities. The remote-control interface could operate according to any standard or proprietary communication protocol.

The media-output interface 704 could comprise a physical wired or wireless communication interface and associated logic, enabling the media player to connect with a media-presentation device and to output media content such as GUIs and streaming-media content for presentation by the media-presentation device. This interface could be an HDMI interface, among other possibilities.

The processor 706 could comprise one or more general purpose processors (e.g., microprocessors) and/or one or more specialized processors (e.g., application specific integrated circuits). And the non-transitory data storage 708 could comprise one or more volatile and/or non-volatile storage components, such as optical, flash, magnetic, RAM, ROM, or other storage, possibly integrated in whole or in part with the processor 706. Further, as shown, the data storage 708 could store stores program instructions 712, which could be executable by the processor 706 to carry out (e.g., cause the media player to carry out) various operations described herein.

Various features described herein could be implemented in this context as well, and vice versa.

Figure 8:
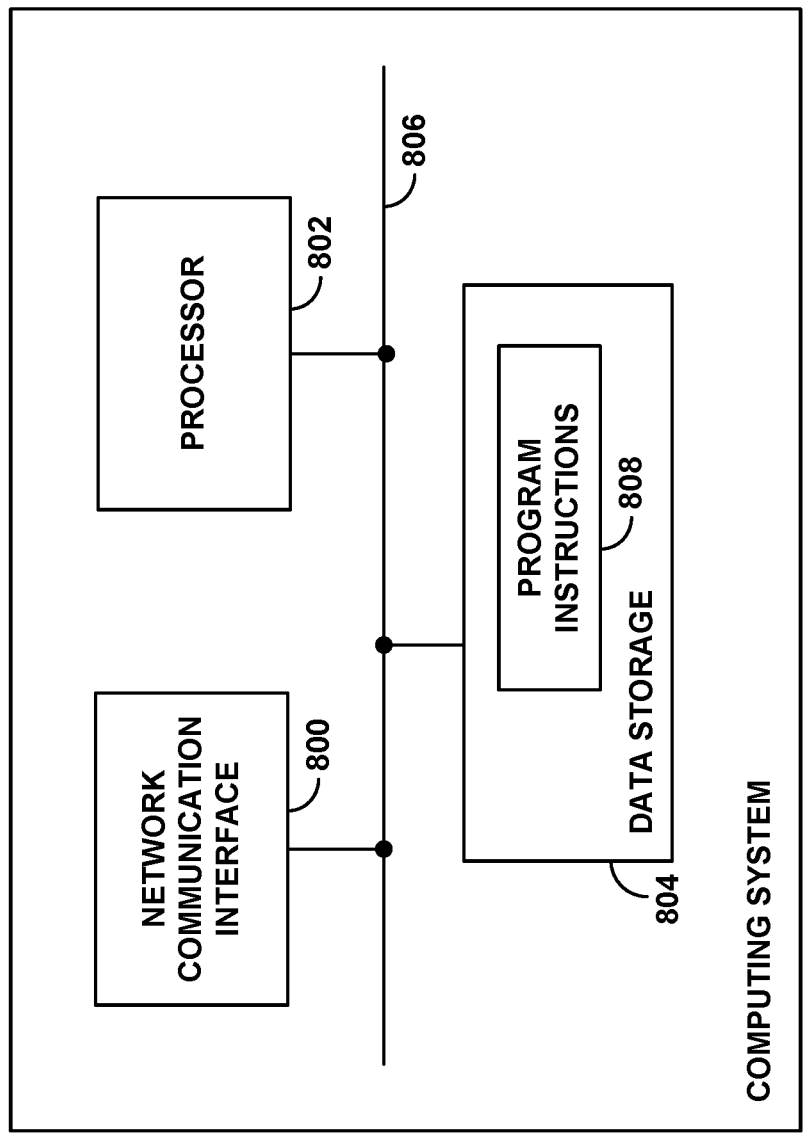
FIG. 8 is a simplified block diagram of an example computing system.

FIG. 8 is next a simplified block diagram of a computing system that could be configured to operate according to the present disclosure. This block diagram may represent aspects of entities discussed herein, such as the media player and/or one or more servers, among other possibilities. As shown in FIG. 8, the example computing includes a network communication interface 800, a processor 802, and non-transitory data storage 804, any or all of which could be integrated together or, as shown, communicatively linked together by a system bus, network, or other connection mechanism 806.

The network communication interface 800 could comprise a physical communication interface and associated logic, enabling the computing system to engage in network communication with one or more other local or remote entities. For instance, the network communication interface

800 could comprise a wireless or wired Ethernet interface or other type of network interface, for engaging in IP communication and/or other type of network communication.

The processor 802 could comprise one or more general purpose processors (e.g., microprocessors) and/or one or more specialized processors (e.g., application specific integrated circuits). And the non-transitory data storage 804 could comprise one or more volatile and/or non-volatile storage components, such as optical, flash, magnetic, RAM, ROM, or other storage, possibly integrated in whole or in part with the processor 802. Further, as shown, the data storage 804 could store stores program instructions 808, which could be executable by the processor 802 to carry out (e.g., cause the computing system to carry out) various operations described herein.

Various features described herein could be implemented in this context as well, and vice versa.

Further, the present disclosure also contemplates one or more non-transitory computer-readable media encoded with, storing, or otherwise embodying program instructions executable by at least one processor of a computing system to cause the computing system to carry out various operations as described herein.

Note also that, though the above description provides for responding to detecting that a media player has moved from a home location to a visited location and is connected with a media-presentation device at the visited location by causing the media player to output media content selected based on that move, alternative implementations may take other forms. Without limitation, for instance, an alternative implementation may involve responding to detecting that a media player has moved from a home location to a visited location by causing the media player to output media content selected based on that move, without consideration of whether the media player is connected with a media-presentation device at the visited location.

Exemplary embodiments have been described above. Those skilled in the art will understand, however, that changes and modifications may be made to these embodiments without departing from the true scope and spirit of the invention.

What is claimed is:

1. A method for controlling media-content presentation, the method comprising:
   detecting, by a computing system, that a media-player device has moved from a home location of the media-player device to a visited location and that the media-player device is connected with a media-presentation device at the visited location; and
   responsive to the detecting, causing, by the computing system, the media-player device to output, for presentation by the media-presentation device at the visited location, media content selected by the computing system based on the media-player device having moved from the home location to the visited location.

2. The method of claim 1, wherein the media-presentation device comprises a display device, and wherein the media content comprises video content.

3. The method of claim 1, wherein detecting that the media-player device has moved from the home location to the visited location and that the media-player device is connected with a media-presentation device at the visited location comprises:
   determining a current location of the media-player device when the media-player device is connected with the media-presentation device;
   comparing the determined current location of the media-player device with the home location; and
   determining, based on the comparing, that the media-player device has moved from the home location to the current location, wherein the current location defines the visited location.

4. The method of claim 1, wherein detecting that the media-player device has moved from the home location to the visited location and that the media-player device is connected with a media-presentation device at the visited location comprises:
   detecting a local connection of the media-player device with the media-presentation device at the visited location.

5. The method of claim 1, wherein the computing system comprises the media-player device and a server platform in network communication with the media-player device.

6. The method of claim 1, wherein causing the media-player device to output, for presentation by the media-presentation device, media content selected by the computing system based on the media-player device having moved from the home location to the visited location comprises causing the media-player device to output, for presentation by the media-presentation device, a welcome message welcoming a user to the visited location.

7. The method of claim 6, further comprising:
   determining that the media-player device has previously been at the visited location; and
   based on the determining that the media-player device has previously been at the visited location, making the welcome message a welcome-back message.

8. The method of claim 1, wherein causing the media-player device to output, for presentation by the media-presentation device, media content selected by the computing system based on the media-player device having moved from the home location to the visited location comprises causing the media-player device to output, for presentation by the media-presentation device, a message that prompts a user of the media-player device to direct the media-player device to output, for presentation by the media-presentation device, information about the visited location.

9. The method of claim 1, further comprising selecting by the computing system, based on the media-player device having moved from the home location to the visited location, the media content to be output by the media-player device for presentation by the media-presentation device at the visited location.

10. The method of claim 9, wherein the selecting is based on a comparison of the visited location with the home location.

11. The method of claim 9, wherein the selecting comprises selecting content that describes an activity at the visited location.

12. The method of claim 9, wherein selecting the media content is based on data indicating content preference by one or more users who traveled from the home location to the visited location.

13. The method of claim 1, wherein the media-player device comprises an over-the-top (OTT) streaming-media-player device.

14. A computing system comprising:
   at least one processor;
   non-transitory data storage; and
   program instructions stored in the non-transitory data storage and executable by the at least one processor to carry out operations for controlling media-content presentation, the operations including:

detecting that a media-player device has moved from a home location of the media-player device to a visited location and that the media-player device is connected with a media-presentation device at the visited location, and responsive to the detecting, causing the media-player device to output, for presentation by the media-presentation device at the visited location, media content selected by the computing system based on the media-player device having moved from the home location to the visited location.

15. The computing system of claim 14, wherein causing the media-player device to output, for presentation by the media-presentation device, media content selected by the computing system based on the media-player device having moved from the home location to the visited location comprises causing the media-player device to output, for presentation by the media-presentation device, a welcome message welcoming a user to the visited location.

16. The computing system of claim 14, wherein the operations further include selecting, based on the media-player device having moved from the home location to the visited location, the media content to be output by the media-player device for presentation by the media-presentation device at the visited location.

17. The computing system of claim 16, wherein selecting the media content is based on data indicating content preference by one or more users who traveled from the home location to the visited location.

18. A non-transitory computer-readable medium embodying program instructions executable by at least one processor of a computing system to cause the computing system to carry out operations for controlling media-content presentation, the operations comprising:

detecting that a media-player device has moved from a home location of the media-player device to a visited location and that the media-player device is connected with a media-presentation device at the visited location; and responsive to the detecting, causing the media-player device to output, for presentation by the media-presentation device at the visited location, media content selected by the computing system based on the media-player device having moved from the home location to the visited location.

19. The non-transitory computer-readable medium of claim 18, wherein causing the media-player device to output, for presentation by the media-presentation device, media content selected by the computing system based on the media-player device having moved from the home location to the visited location comprises causing the media-player device to output, for presentation by the media-presentation device, a welcome message welcoming a user to the visited location.

20. The non-transitory computer-readable medium of claim 18, wherein the operations further include selecting, based on the media-player device having moved from the home location to the visited location, the media content to be output by the media-player device for presentation by the media-presentation device at the visited location.

* * * * *